Figure 1:
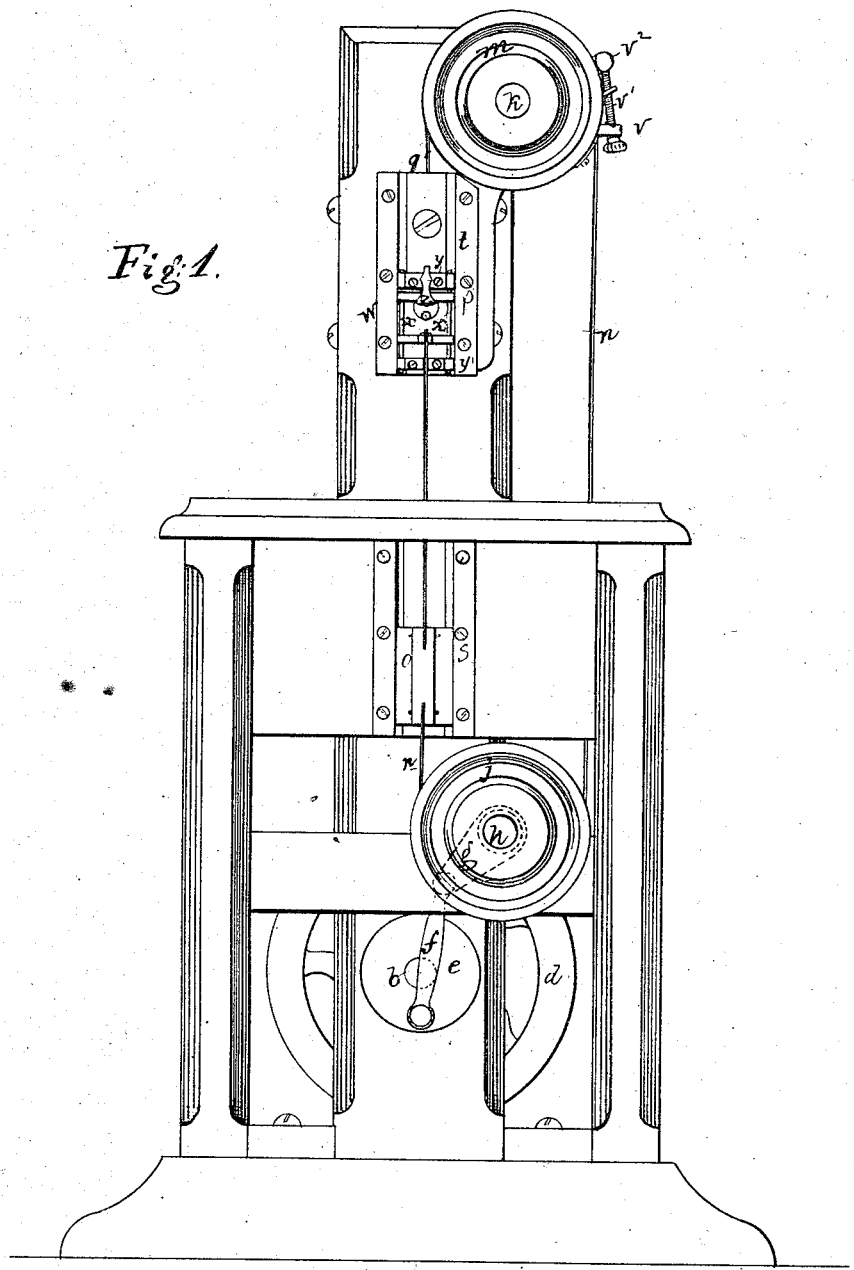

C. M. HAYDEN.
Jig-Saw.

No. 159,412.

2 Sheets--Sheet 1.

Patented Feb. 2, 1875.

Witnesses.
Geo. T. Smallwood Jr.
Chas. R. Abell

Inventor:
Chas. M. Hayden,
per John J. Halsted,
Att'y.

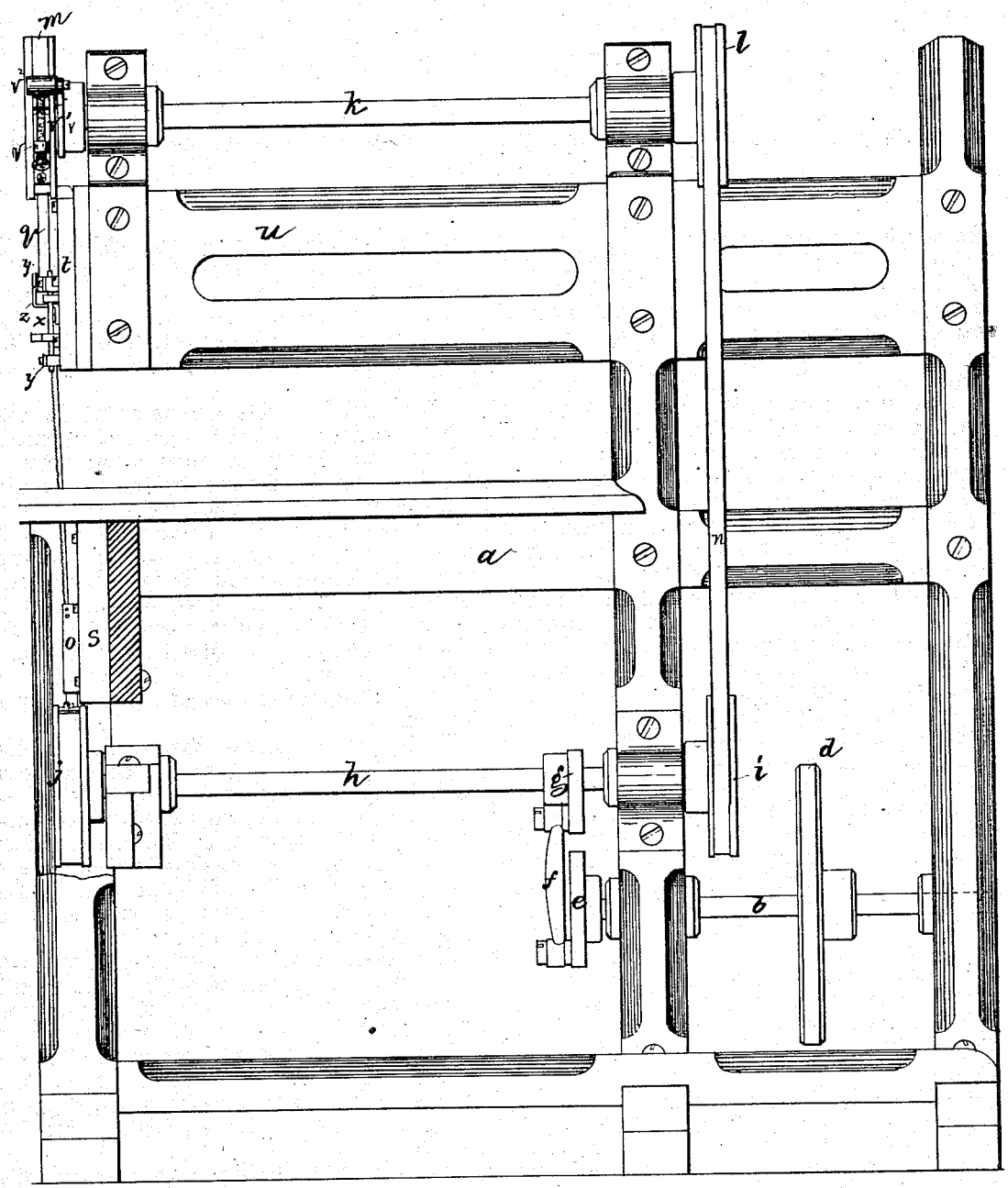
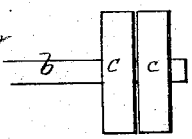

UNITED STATES PATENT OFFICE.

CHARLES M. HAYDEN, OF HANOVER, MASSACHUSETTS.

IMPROVEMENT IN JIG-SAWS.

Specification forming part of Letters Patent No. 159,412, dated February 2, 1875; application filed August 29, 1874.

*To all whom it may concern:*

Be it known that I, CHARLES M. HAYDEN, of Hanover, in the county of Plymouth and State of Massachusetts, have invented certain Improvements in Jig-Saws; and I do hereby declare that the following, taken in connection with the drawings which accompany and form part of this specification, is a description of my invention sufficient to enable those skilled in the art to practice it.

My improvements relate to a special means for operating the saw by rocking shafts and their connecting-bands in such manner that the bands shall not interfere with the free movements on the table of the material to be sawed; to a means for readily disconnecting one end of the saw, that it may be passed through a hole in the material in commencing certain kinds of work; and to a special means for tightening the saw.

Fig. 1 represents a front elevation of a machine embodying my invention. Fig. 2 shows the machine in side elevation.

The frame which supports the mechanism is shown at $a$. $b$ is the driving-shaft. $c\ c$ are fast and loose pulleys. $d$ is a fly-wheel; and $e$ is a crank on said shaft. $f$ is a link, which connects crank $e$ with another crank, $g$, on the rock-shaft $h$. $i$ is a band-wheel, secured on the rear end of shaft $h$; and $j$ a similar band-wheel, secured at its other end. $k$ is another rock-shaft, parallel to $h$, and located above the table, and having at its respective ends band-wheels $l\ m$. $n$ is a metal strap, one end of which is secured to the periphery of wheel $i$, and the other end to the periphery of wheel $l$, extending only partially around these wheels, so that, as the lower shaft, when rocking, pulls down the strap, it shall turn the upper shaft to a corresponding extent, and in the same direction.

The saw is connected, by slides $o'\ p$ and straps $q\ r$, to the front rocking wheels $j\ m$, the slide $o$ moving in a guide-plate, $s$, on an upright beneath the table, and the slide $p$ in a guide-plate, $t$, on the front of the bracket or overhanging arm $u$ above the table. Each of the straps $q\ r$ is secured, respectively, to its band-pulley $j$ or $m$, and extends only partially around the same. But while these bands, and the saw to which they are connected, are on one side only—say, the left side—of the front wheels, $j\ m$, the other strap, $n$, is on the opposite or right side of the rear wheels, $i\ l$.

The effect of this arrangement is, that when the rock-shaft $h$ is operated by means of its crank to pull downward the strap $n$, the rock-shaft $k$ pulls upward the saw and its connecting-straps; and, when shaft $h$ is rocked in the other direction, the saw is pulled downward, and the shaft $k$ pulls upward the strap $n$; and a most important advantage is that the objections incident to using an endless band are avoided, and the saw is sure to move in direct right lines, and the table is clear for the free movements of the work all around the saw as a central or turning point.

To tighten or loosen the tension of the saw, the upper strap, $q$, is adjustably connected, by a screw-clamp, $v\ v^1\ v^2$, to the wheel $m$, the screw, upon being tightened up, serving to increase the tension of this strap and of the saw, the screw $v^1$ passing through an eye in the strap, as well as through eyes in the two parts $v\ v^2$ of the clamp, $v$ being fixed to the wheel, and $v^2$ being adjustable.

To release readily the upper end of the saw, that it may be passed through a hole or slit made in the wood before commencing to saw a pattern in the body of the wood, I employ a slide-frame, $w$, adapted, by means of its rods $x$, extending through the cross-bar $y$ of the dovetailed slide-head $p$, to be slightly raised and lowered through the agency of a cam-lever, $z$, on the slide $p$.

The saw, at its top, lodges in a vertical slit in the lower cross-bar $y'$, and also in a similar slit in the lower cross-bar of the slide-frame $w$, a pin through an eye in the top of the saw holding the same to place, and the cam-lever pulling it tight. Now, when it is desired to release the saw, the cam-lever is turned down, the frame $w$ is slightly lowered, the tension lessened, and the saw may be easily slipped out of the slits in the cross-bars, the pin removed, and the top of the saw left free. The same devices make it an easy matter again to put the saw in working position.

I claim—

1. The combination, with the saw and the slide-head $p$, of the sliding frame $w$ and cam-lever $z$, substantially as and for the purpose set forth.

2. Also, in combination with the saw and with the rocking wheels $j$ $m$ and strap-connections, the adjusting-clamp $v$ $v^1$ $v^2$, substantially as and for the purpose set forth.

CHARLES M. HAYDEN.

Witnesses:
M. W. FROTHINGHAM,
C. WARREN BROWN.